May 4, 1937.　　　　C. F. RAUEN　　　　2,079,527
POWER TRANSMISSION MECHANISM
Filed Sept. 13, 1930　　　3 Sheets-Sheet 1
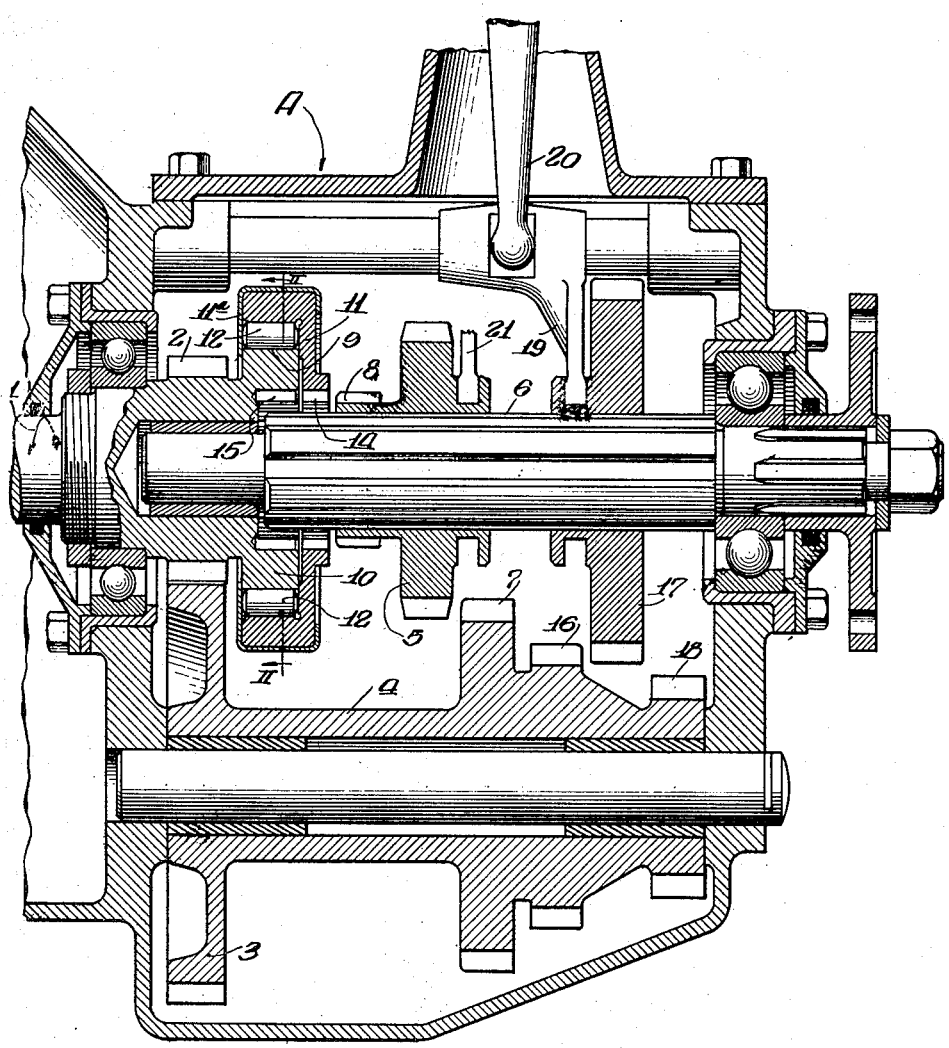
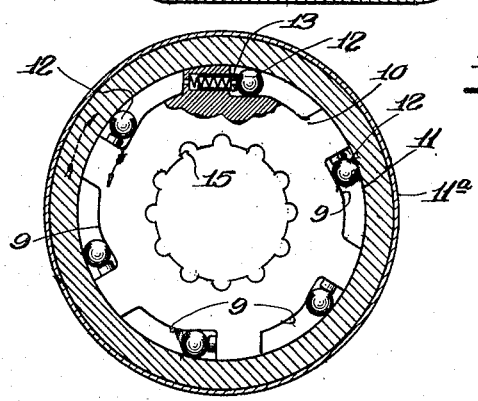
INVENTOR.
Carl F. Rauen,
BY Charles W. Hill
ATTORNEYS.

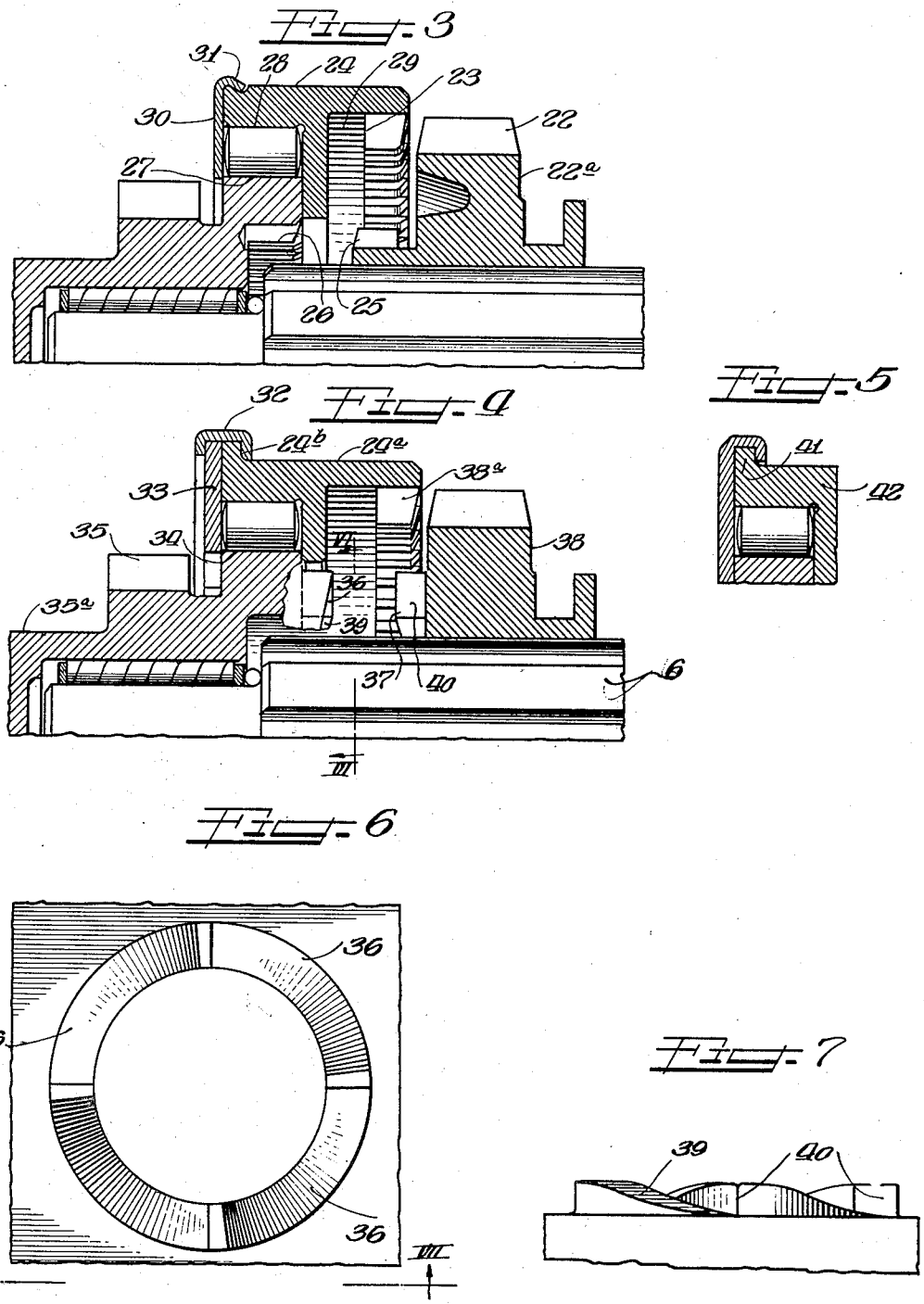

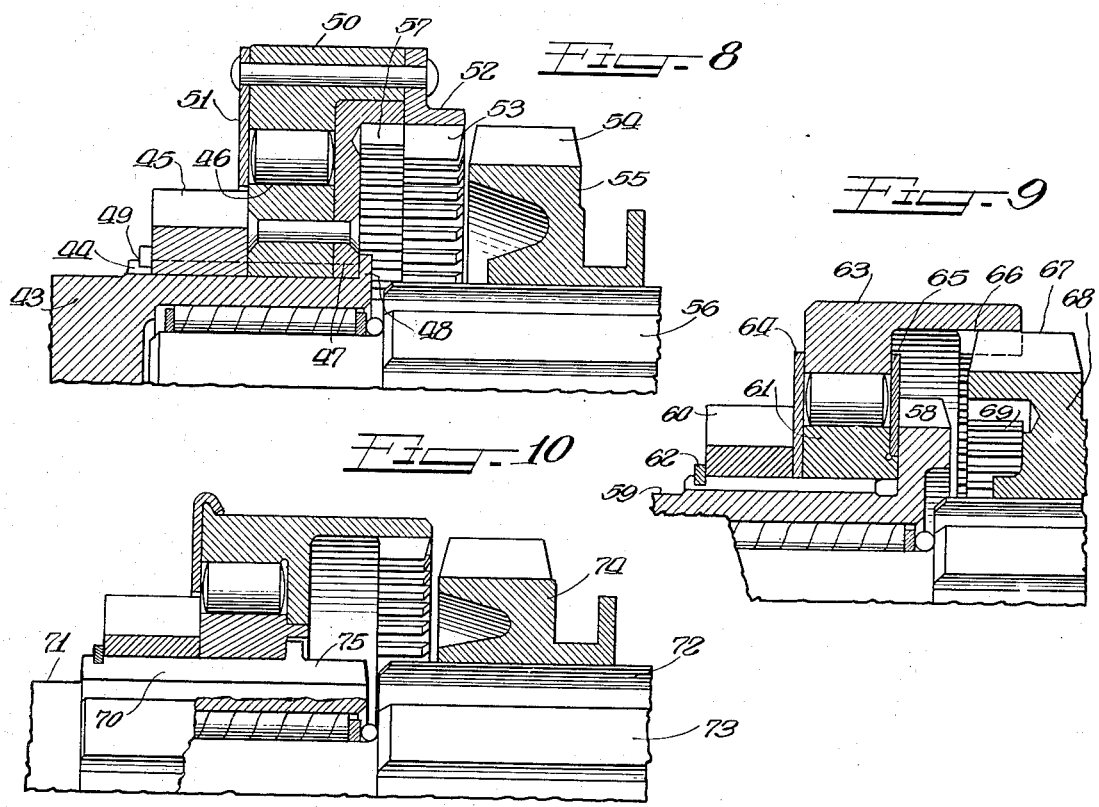

Patented May 4, 1937

2,079,527

UNITED STATES PATENT OFFICE 2,079,527

POWER TRANSMISSION MECHANISM

Carl F. Rauen, Detroit, Mich.

Application September 13, 1930, Serial No. 481,647

37 Claims. (Cl. 192—48)

This invention relates to power transmission systems.

In transmissions of the character now universally in use in motor vehicles, a very material drawback resides in the fact that when the speed of the vehicle propelling shaft tends to exceed that of the engine shaft, the engine acts as a brake or "drag". This is particularly noticeable when the car is moving at high speed, although this action of the engine makes itself felt even to some extent at medium speeds. This action is due to the fact that when the transmission gears are set for a given drive, the connection between the driving shaft and the driven shaft is such that they must move together, regardless of direction or speed.

When driving on the open road, at relatively high speed, it is often desirable to release the accelerator and at the same time continue moving at substantially the same speed as that acquired immediately before release of the accelerator, that is, to coast.

Attempts have heretofore been made to accomplish the above ends by changes in the transmission structure but these attempts have involved more or less complicated constructions, often requiring complete reorganizations of conventional transmissions and entailing manufacturing costs which are prohibitive.

It is accordingly the principal object of my invention to provide a new and improved transmission system by which the above ends will be gained.

A further object of the invention resides in the provision of an improved transmission system employing novel clutch means fixed against longitudinal movement relative to the prime mover or driving shaft whereby the latter will be automatically disengaged from the propelling or driven shaft when the speed of the latter tends to exceed that of the former.

My invention contemplates as a further object the employment of extremely simple mechanism involving a minimum of moving parts whereby the vehicle will be allowed to coast when desired and the driving shaft and the driven shaft may be recoupled, so that the engine or driving shaft may act as a brake with respect to the propeller shaft, when the speed of the latter tends to exceed that of the former.

Another important object of the invention involves the provision of an improved transmission which not only provides for free wheeling as well as direct drive, but also makes possible the shifting from the next lower speed drive to each of these drives without requiring the use of the main transmission clutch, thereby eliminating an operation heretofore necessary in transmission systems.

In carrying out my invention, I employ a one-way or over-running clutch in conjunction with the driving and driven shafts of a transmission and connected against axial or longitudinal movement relative to the driving shaft. The parts of the over-running clutch are provided with clutch teeth so arranged that first the teeth of one of said parts is engaged by a member slidable on the driven shaft to permit free relative movement of the shafts in one direction with respect to each other, and subsequently the clutch teeth on the other clutch part are engaged by the slidable member in response to an extended shift or over-shift of the shift lever, thus providing for a positive or direct or two-way connection or drive between the shafts.

An outstanding advantage of my invention resides in the fact that it may be applied to the conventional type of transmission with a very small change in its structure, and the parts are so extremely simple, that they may be manufactured at a very low cost and may be readily assembled and disassembled. The load borne by these parts is quite small in view of the fact that they come into play for the most part at higher speeds so that the parts may be of light construction if so desired. Moreover it will be noted that with a transmission embodying my invention, the vehicle may be operated so as to take advantage of the free-wheeling or coasting feature, or not, depending upon the will of the driver, and the additional effort required in setting up the direct drive is practically negligible.

Another advantage of no little importance lies in the fact that the free-wheeling feature makes possible a great saving in the amount of fuel employed, since during a large part of the time that the vehicle is moving, it may be driven by its own momentum without the engine acting as a brake, which latter is not the case in the conventional type of transmission.

Other and further important objects and advantages of this invention will be apparent from the disclosure in the specification and the accompanying drawings.

This invention (in a preferred form) is illustrated in the drawings and hereinafter more fully described.

On the drawings:

Figure 1 is a sectional view through a transmission constructed in accordance with my invention, showing one form of my over-running clutch or free-wheeling mechanism.

Figure 2 is a sectional view, partly broken away, taken approximately in the plane indicated by the line II—II of Figure 1, certain parts being shown in elevation.

Figure 3 is a fragmentary sectional view, partly in elevation, illustrating a modified form of my invention.

Figure 4 is a view similar to Figure 3 but showing a further form of the invention.

Figure 5 is a fragmentary sectional view, partly in elevation, showing another construction for holding the clutch roller in position.

Figure 6 is a fragmentary elevational view of certain clutch teeth shown in Figure 4, taken approximately in the plane indicated by the line VI—VI of Figure 4.

Figure 7 is a side view of the construction shown in Figure 6.

Figures 8, 9, 10, 11, and 12 are views similar to that of Figure 3, showing still further forms of my invention.

Referring now more particularly to the drawings, wherein similar reference characters refer to identical parts, the drive or clutch shaft 1 of the transmission, generally indicated as A, is connected to the engine through the usual clutching means (not shown) and is provided with teeth 2, adapted to mesh with the gear 3 of the counter-shaft gear arrangement 4, rotatably mounted on the counter-shaft. The gear 5 is slidably splined on the driven shaft 6, and when slid to the right, as viewed in Figure 1, it will mesh with the gear 7 of the counter-shaft cluster, thereby giving second speed as is conventional in present automobile transmissions. The gear 5 is also provided with suitable clutch teeth 8, the function of which will appear as the description proceeds.

The shaft 1 is provided with cam surfaces 9, on one member 10 of an over-running clutch. These cam surfaces 9 form converging pockets with the annulus or shell 11, said shell being another member of the over-running clutch. Rollers 12 are located in the pockets and are urged towards the converging ends of the pockets by the spring plungers 13, and wedge themselves between the members 10 and 11 upon relative motion between these members as indicated by the arrows, thereby forming a driving connection between these members in the well-known manner. Upon relative movement of the members 10 and 11 opposite to that indicated by the arrows, which condition will arise for example when the accelerator is released, whereupon the speed of the member 11 tends to exceed that of the member 10, the rollers 12 will not wedge themselves between these members with the result that the engine will not act as a brake upon the propeller shaft and over-running or free-wheeling occurs.

For the purpose of maintaining the parts of the over-running clutch against separation, a stamping 11a is spun around the clutch member 11 and is provided with a side wall which, with the member 11, straddles the ends of the rollers 12 and a circumferential portion of the clutch member 10.

The clutch member 11 is provided with suitable clutch teeth 14, adapted to mesh with the teeth 8 on the gear 5. The shaft 1, or more suitably the member 10, is also provided with suitable clutch teeth 15, also adapted to mesh with the teeth 8 on the gear 5. The gears 16, 17, and 18 are part of the low and reverse train, the reverse idler not being shown. The gear 17 is shifted in the usual manner by means of the shift fork 19 and the shift lever 20. The gear 5 is shifted by means of a shift fork 21 also operated by the shift lever 20. The connections from the lever 20 to the fork 21 are not shown, but, in conformity with conventional practice, are similar to those shown by the fork 19. Low, reverse and second speed gear drives are obtainable as in the conventional automobile transmission.

The operation of my improved construction is as follows: Shift lever 20 is actuated by the operator in the usual manner for obtaining direct drive, whereupon the gear 5 is shifted in Figure 1 until the teeth 8 of said gear mesh with the clutch teeth 14 on the clutch member 11. The movement of the shift lever 20 for causing this meshing of the teeth is exactly the same as is ordinarily required for causing direct drive. It will be apparent from the illustrations, considered in connection with the above description, that the rollers 12 will become wedged between the clutch members 10 and 11, thereby setting up a positive drive from the engine or driving shaft 1 to the driven shaft 6. When it is desired to free-wheel, or coast, nothing further need be done, since the tendency of the driven shaft 6 to rotate faster than the engine shaft 1 will result in a free relative movement between the clutch members 10 and 11. Such free-wheeling or coasting is automatically provided for without necessitating any action on the part of the driver. Suitable detent means, not shown, may be provided, as is customary in automobile transmissions, to hold the gear 5 so that the teeth 8 mesh only with the teeth 14 unless otherwise desired. Due to the fact that the inertia of the clutch member 11 is very small, the shift to high or over-running position can be made at almost any speed without jar or clashing of the teeth, thus obviating the necessity of releasing the main drive clutch and insuring a quick and positive shift. It will be appreciated then, that in addition to providing for automatic free-wheeling, my improved construction also eliminates an operation now necessary in conventional transmissions.

Whenever it is desired to use the engine as a brake for retarding the car, or whenever it is otherwise desired to "short-circuit" the over-running clutch, the gear 5 is shifted still farther to the left as viewed in Figure 1 so that the teeth 8 mesh also with the teeth 15 of the clutch member 10, the teeth 8 being purposely long enough so that they will remain in mesh with the teeth 14 of the clutch member 11. When the teeth 8 are thusly meshed with the teeth 15, a positive two-way drive is set up between the driving shaft 1 and the driven shaft 6, so that each shaft will drive the other, and there will be no over-running.

In Figure 3 is shown an arrangement wherein the teeth 22 of the second speed gear 22a have an additional function in that they are adapted to mesh with suitable clutch teeth 23 formed on the over-running clutch member 24 to give a one-way or free-wheeling drive, and when it is desired to have a two-way drive, that is, the conventional direct drive, the gear 22a is shifted still farther to the left until the clutch teeth 25 thereon are meshed with cooperating teeth 26 formed in the other over-running clutch member 27, which cooperates with the clutch member 24 by means of the rollers 28. When the teeth 25 are meshed with the teeth 26, the gear teeth 22 pass partially into the space 29. The various parts of the roller clutch are maintained as a unit by means of the plate 30 which is spun over into a groove at 31.

In the foregoing arrangement illustrated in Figure 3 the clutch teeth for positive drive in both directions, that is teeth 25 and 26, may be similar to those now in use in automobile transmissions for direct drive. When the engine is propelling the car, the drive will be positive, regardless whether the teeth of only the over-running member of the clutch are engaged, or the teeth of the other member of the clutch are engaged. However, when the car is driving the engine, the positive drive clutch teeth will do the driving, the engine acting as a brake, for in this condition the over-running clutch cannot drive. Any type of suitable clutch teeth, however, can be used.

Figure 4 shows an arrangement similar to Figure 3 except for the manner in which the clutch parts are maintained together and the shape of the clutch teeth providing the drive from the engine. In this arrangement the shell or over-running clutch member 24a is similar to the shell 24 of Figure 3 but is held in place somewhat differently, that is, the shell 24a has a shoulder 24b or other means over which a part 32 is spun to retain a plate 33, over which it is also spun, said plate overlapping the cam portion 34 of the over-running clutch, formed integral with the drive gear 35 and the engine or drive shaft 35a. Ratchet shaped clutch teeth 36, also formed on the shaft 35a are adapted to mesh with similar teeth 37 on the second speed sliding gear 38. The teeth 36 and 37 are so cut that they will permit the gear 38 to drive the shaft 35a, but they will not permit the shaft 35a to drive the gear 38. The gear 38 in this case is driven from the engine only through the over-running clutch. It will be apparent from the construction just described that the gear 38 in this case is driven by the over-running clutch while said gear is in the coasting position and also while it is connected to the engine through the ratchet teeth, and that the teeth 36 and 37 come into play only when the car drives the engine, i. e., when the engine acts as a brake for the car. In other words, for free-wheeling or coasting, the only teeth in mesh are those designated at 38a and those of the gear 38, while for positive drive in both directions, the teeth 36 and 37 must also be engaged.

In the construction illustrated in Figures 1 and 3, using conventional clutch teeth for the drive from the engine, shifting to establish this drive requires considerable skill, as this corresponds to the direct drive position of conventional transmissions. However, by using ratchet type teeth as shown in Figures 4, 6, and 7, the shift can be made with no difficulty. When it is desired to use the engine as a brake, or when a two way drive connection is desired between the car and engine for any reason whatever, if the teeth 36 and 37 should abut, they will slide down the ramp portions 39 until they abut at the flat portions 40 of the next teeth. It is thus apparent that it will be practically impossible to foul or miss the shift.

In Figure 5 is shown a modification of the means for holding the clutch parts together, wherein the part 32 and plate 33 of Figure 4 are combined as one piece; which is spun over the shoulder 41 formed on the clutch shell 42.

In Figure 8, I have illustrated a type of construction which is perhaps more compact than any previously shown. In this arrangement the drive shaft 43 is splined at 44 and carries the drive gear 45, the cam 46 of the over-running clutch and the positive clutch plate 47, said clutch plate being preferably riveted to the cam 46 as shown. The foregoing parts are retained on the shaft 43 by the shoulder 48 at one end and a snap ring 49 at the other end. The shell 50 of the over-running clutch has riveted to it a retaining plate 51 and also a clutch plate 52, there being clearance between the clutch plates 47 and 52 to permit relative rotation of these parts.

The clutch plate 52 is provided with clutch teeth 53 adapted to mesh with the gear teeth 54 on the gear 55, for a one-way drive connection between the shafts 43 and 56. The clutch plate 47 also has clutch teeth 57 adapted to mesh with the teeth 54 on the gear 55 for a two-way or positive drive connection between the shafts 43 and 56. It is thus apparent that the conventional second speed gear 55 need be provided with no additional teeth or other means, regardless whether free-wheeling or direct drive is desired.

Figure 9 shows still another modification wherein the positive drive clutch teeth 58 are formed integral with the clutch shaft 59 while the drive gear 60 and the cam 61 of the over-running clutch are splined on said clutch shaft and held in place by the snap ring 62. The shell 63 of the over-running clutch is held in place by the plates 64 and 65, and is provided with clutch teeth 66 adapted to mesh with the gear teeth 67 of the gear 68 for one way drive. The gear 68 is provided with clutch teeth 69 adapted to mesh with the teeth 58 for a two-way drive. The gear 68 is shown shifted to the one way drive position.

Figure 10 is a modification of Figure 8 wherein the splines 70 on the drive shaft 71 are substantially identical with the splines 72 on the driven shaft 73, so that for the positive drive position, the splined or broached interior of the gear 74 meshes with the splines 70 at 75, thus eliminating the need of cutting additional teeth for the positive drive. It will be noted that the means availed of for holding the clutch parts together is similar to that shown in Figure 3.

In the constructions heretofore described, it will be noted that the inner clutch member is engageable by the slidable gear for setting up a direct or positive drive, whereas the outer or shell clutch member provides the over-running or one-way drive. In the forms of my invention shown in Figures 11 and 12, it will be seen that the above arrangement is reversed, the one-way drive being taken by the inner clutch member and the direct or positive drive being taken by the other clutch member.

In Figure 11, shell 76 of the over-running clutch is formed integral with the gear 77 although these parts could be riveted or otherwise fastened together. The cam portion 78 of the over-running clutch is adapted to be driven by the shell 76 through the wedging action of the rollers 79, and is provided with clutch teeth 80 adapted to mesh with the mating teeth 81 on the gear 82, when the gear 82 is slid to the left. The rollers 79 and the cam 78 are held in place by the plate 83, which is riveted to the shell 76 together with the clutch plate 84. The clutch plate 84 has clutch teeth 85 adapted to mesh with the gear teeth 86 on the gear 82 when the gear 82 is slid still farther to the left to give a positive drive connection between the teeth 85 and the gear 82. When this shift is made the teeth 81 move into the space 87, but said teeth are made long enough so as not to pass out of mesh with the teeth 80. However, the teeth 80 could be made longer and the teeth 81 of normal length if desired.

In the form depicted in Figure 12, the shell 88 of the over-running clutch is provided with clutch teeth 89 adapted to mesh with the gear teeth 90 for positive drive, and is splined at 91 to the member 92 which may be integral with the drive gear or shaft. The shell 88 is provided with a flanged portion 89a which, with the flanged member 92 holds the rollers 92a and the cam 93 against endwise relative movement, the whole assembly being held in place by the part 88a which is flanged over the part 92 and the shell 88. The cam 93 of the over-running clutch is centered on the shoulder 94, and is provided with clutch teeth 95 adapted to mesh with the clutch teeth 96 on the gear 97 for one-way drive when the gear 97 is moved to the left, to its first high gear or coasting position.

It will be noted that in every form of the invention described, the shift lever is adapted to occupy a conventional position corresponding to the position occupied for setting up the direct drive in the usual type of transmission, the shifting means being suitably modified in accordance with the requisites of this invention so that the lever may be subjected to extended movement or overshift, whereby to short circuit the one-way drive of my invention and set up a two-way or positive drive corresponding to direct drive in other transmissions.

I desire it understood that while in illustrating my invention in its various forms, a friction type roller clutch is employed, the rollers being spring pressed so that when they drive, their action is substantially instantaneous, I consider it well within the province of my invention to employ any other suitable type of clutch to accomplish the desired result.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a motor vehicle transmision, a drive member having internal teeth and forming one part of an over-running friction clutch, a driven member having external teeth, the other part of the clutch having internal teeth and being rotatable relative to the first part only in the same direction as that in which the drive member rotates, means for causing the external teeth to engage first with the teeth of the second clutch part to provide for coasting, and then with the teeth of the first clutch part to set up a two-way drive between the members, and a device for preventing separation of the clutch parts.

2. In a motor vehicle transmission, a drive shaft having two cam portions, an overrunning clutch member operatively associated with one of said portions, a driven shaft, a device on the driven shaft for connecting the driven shaft with the over-running clutch member whereby to establish a one-way drive between said shafts in one direction, and for connecting the driven shaft with the other cam portion to establish a drive between the shafts in the opposite direction.

3. In a transmission for motor vehicles, a drive shaft, an over-running clutch splined thereon, means for preventing relative axial movement between the shaft and the clutch, the splines of the shaft extending beyond the clutch, a driven shaft, a member movably splined thereon, the splined portions of the shafts being alike and of substantially the same diameter, said clutch and member having means for establishing a one-way drive between said shafts, said member being shiftable for engagement with the extending splines of the drive shaft without separation from the driven shaft splines, for establishing a two-way drive between said shafts.

4. In a transmission for motor vehicles, drive and driven shafts having juxtaposed substantially identical splined portions, a one-way clutch mounted against axial movement on the drive shaft, a coupling device movably mounted on the splined portion of the driven shaft, the splined portion of the drive shaft extending between said clutch and said device, and means on said device and clutch for establishing a one-way drive between said shafts upon shift of the device, said device upon further shift being engageable with the splined portion of the drive shaft to thereby couple the shafts for a two-way drive.

5. In a motor vehicle transmission, drive and driven shafts having juxtaposed splined portions, a one-way clutch mounted against axial movement on the drive shaft, a coupling device movably mounted on the splined portion of the driven shaft, the splined portion of the drive shaft extending between said clutch and device, and means on the device for connecting the latter to the clutch for establishing a one-way drive between the shafts, and engageable with the splined portion of the drive shaft to thereby couple the shafts for a two-way drive, said drives being accomplished progressively.

6. In a transmission for motor vehicles including drive and driven shafts and change speed gearing, an outer member of an over-running clutch fixed against axial movement relative to one of said shafts, an inner clutch member, and means including the gear teeth of a gear of the gearing for progressively establishing positive connection between each of said clutch members respectively and the other shaft, whereby first a one-way and then a two-way drive is established between the shafts.

7. In a motor vehicle mechanism, driving and driven elements, a pair of overrunning oppositely directed clutches including an axially shiftable member associated with said elements, and means for shifting said member to selectively bring one clutch or both clutches into operation, whereby said clutches cooperate to prevent overrunning between said elements, said member comprising a gear whose gear teeth cooperate with one of said clutches.

8. In a motor vehicle transmission mechanism, driving and driven elements, a pair of overrunning oppositely directed clutches including an axially shiftable member associated with said elements, and means for shifting said member for selectively bringing one clutch or both clutches into operation, whereby said clutches cooperate to prevent overrunning between said elements, said member comprising a gear whose gear teeth cooperate with one of said clutches, and means independent of said clutches and associated with said gear for driving one of said elements from the other element.

9. In a motor vehicle transmission mechanism, a drive member having clutch teeth, an overrunning element carried by the drive member and having internal clutch teeth, a driven member having clutch teeth for cooperation with the aforesaid teeth, the teeth of one clutch being engageable before those of the other, whereby one-way and two-way drives between the drive and driven members are selectively obtainable, the drive member teeth and the corresponding teeth on the driven member being formed to facilitate their positive interengagement regardless of the relative speeds of the respective drive and driven members.

10. In a motor vehicle transmission mechanism including a pair of movable elements, a part carried by and having a one-way overrunning relationship to one of said elements, a part rotatable with the other element, said parts having cooperating coupling means affording a drive of the other element by said one element but not vice versa, and one-way overrunning means affording a drive of said one element by said other element.

11. In a motor vehicle transmission mechanism including a pair of movable elements, a part carried by and having a one-way overrunning relationship to one of said elements, a part rotatable with the other element, said parts having cooperating coupling means affording a drive of the other element by said one element but not vice versa, and one-way overrunning means affording a drive of said one element by said other element in the same direction.

12. In a motor vehicle transmission mechanism including a pair of movable elements, a part carried by and having a one-way overrunning relationship to one of said elements, a part rotatable with the other element, said parts having cooperating coupling means affording a drive of the other element by said one element but not vice versa, and lost-motion coupling means affording a drive of said one element by said other element.

13. In a motor vehicle transmission mechanism including a pair of movable elements, a part carried by and having a one-way overrunning relationship to one of said elements, a part rotatable with the other element, said parts having cooperating coupling means affording a drive of the other element by said one element but not vice versa, and ratchet-like means affording a drive of said one element by said other element.

14. In a motor vehicle transmission mechanism including a pair of movable elements, a clutch part carried by and having a one-way overrunning relationship to one of said elements, a part rotatable with the other element, said parts having cooperating coupling means affording a drive of the other element by said one element but not vice versa, and ratchet-like clutch means affording a drive of said one element by said other element, said clutches being oppositely directed and of the one-way type, whereby when one only of said clutches is engaged, an overrunning one-way drive between said elements is established, and when both of said clutches are engaged, overrunning between said elements is prevented.

15. In a motor vehicle mechanism including drive and driven elements, a pair of overrunning oppositely directed clutches associated with said elements, one of said clutches being of the instantaneously acting type, whereby the driven element may be rotated by the drive element and the driven element may overrun the drive element, the other clutch being such as to provide lost motion prior to driving engagement thereof to enable its parts to interengage without clashing when the driven element is rotating faster than the drive element in the same direction, when a two-way drive between said elements is desired, said parts remaining inter-engaged when the drive element drives the driven element.

16. In a transmission mechanism for a motor vehicle including a drive shaft and a driven shaft and a change speed gear movably splined on the driven shaft, a one-way overrunning clutch carried by the drive shaft in axially stationary relation thereto, the drive shaft and gear having interlockable clutch teeth, said overrunning clutch having internal teeth interlockable with the gear teeth of said gear, said gear being shiftable along the driven shaft for interlocking said internal teeth with said gear teeth to establish a one-way drive between said shafts and also for interlocking said clutch teeth to establish a two-way drive between said shafts.

17. In a motor vehicle transmission mechanism, a drive member having internal teeth and forming one part of an overrunning friction clutch, a driven member having external teeth, the other part of the clutch having internal teeth and being rotatable relative to the first part only in the same direction as that in which the drive member rotates, and means for causing the external teeth to engage first with the teeth of the second clutch part to provide for coasting and then with the teeth of the first clutch part to set up a two-way drive between said members.

18. In a motor vehicle transmission, the combination of three elements having internal and external clutch teeth of substantially the same pitch diameter, only one of said elements being shiftable, and means for shifting said shiftable element for selectively and operatively engaging the teeth thereof with the teeth of the other two elements in clutching relationship for effecting different functions in said transmission, a one-way clutch operatively disposed between said other two elements, and a shaft upon which said shiftable element is mounted, and another shaft aligned therewith and operatively connected to said other two elements.

19. In a motor vehicle transmission, a one-way clutch having driving and driven parts provided with teeth on each of its parts, and a sliding member provided with teeth, said member being shiftable to couple teeth thereon with the teeth of one of said clutch parts to set up a one-way drive and further shiftable to couple teeth thereon with the teeth of the other clutch part to set up a two-way drive, and a shaft upon which said member is slidable.

20. In a motor vehicle transmission, the combination of three elements having internal and external clutch teeth of substantially the same pitch diameter, only one of said elements being shiftable, and means for shifting said shiftable element for selectively and operatively engaging the teeth thereof with the teeth of the other two elements in clutching relationship for effecting different functions in said transmission, a clutch structure operatively disposed between said other two elements, a shaft upon which said shiftable element is mounted, and another shaft aligned therewith and operatively connected with said other two elements.

21. In a motor vehicle transmission, a shaft provided with splines formed integrally therewith, a cam element of an overrunning clutch having splines mating with the splines of said shaft and secured against axial movement relative to said shaft, a shell element of an overrunning clutch operatively associated with and disposed outwardly of said cam element, said shell element being secured against axial movement relative to said cam element and being provided with teeth, and a sliding clutch element having splines cooperable with the splines of said shaft and teeth cooperable with the teeth of said shell for connecting said shaft and shell around said cam element.

22. In a motor vehicle transmission, driving and driven members, one of which is provided with external radial projections and the other of which is provided with internal radial projections, means operable for providing a one-way driving connection between said members and including an overrunning clutch element having internal radial projections mating with said external radial projections of one of said members, means securing said members and said element against axial movement relative to each other, a sliding clutch element having internal and external radial projections cooperable with the external and internal projections of said driving and driven members, respectively, for bridging said overrunning clutch element to provide a two-way driving connection between said driving and driven members.

23. In a motor vehicle transmission, a one-way clutch device having driving and driven rotatable parts, means for coupling said parts together, said clutch parts being coupled for rotation together only by relative angular movement thereof, each of said parts being provided with teeth, another device provided with teeth, a shaft operatively associated with each of said devices, the teeth of one of said parts and the teeth of said other device being engageable to provide a one-way drive between said shafts, one of said devices being shiftable to couple the teeth on the other of said parts with teeth on said other device to provide a two-way drive between said shafts, the faces of the teeth on said last mentioned part and the teeth on said other device being at an angle to the plane of rotation of said devices so that engagement of such teeth will cause rotation of one of the parts of said one-way clutch device in the overrunning direction, said parts being constrained against substantial relative axial movement.

24. In the drive system of a motor vehicle, the combination of driving and driven shafts, a member of an overrunning friction clutch fixed against axial movement relative to one of said shafts, a clutch member carried by said fixed clutch member and movable relative thereto, and means including a shiftable clutch element slidably splined to the other of said shafts and cooperable with said clutch members for progressively establishing a driving connection between each of said clutch members respectively and said other shaft, whereby first an overrunning friction drive and then a two-day drive is established between said shafts.

25. In the drive system of a motor vehicle, a drive member having internal radially extending projections and forming one part of an overrunning friction clutch, a driven member having external radially extending projections, the other part of said clutch having internal radially extending projections and being relatively movable axially with respect to said driven member, and means for causing the external radially extending projections of said driven member to engage first with the internal radially extending projections of said other part of said clutch to provide an overrunning friction drive and then with the internal radially extending projections of said drive member to set up a two-way drive between said members.

26. In the drive system of a motor vehicle, the combination of three elements having internal and external radial projections, the projections of one of said elements being engageable with the projections of the other two of said elements, a driven shaft, only one of said elements being shiftably splined on said driven shaft, and means for shifting said shiftable element for operatively engaging the radial projections thereof with the radial projections of said other two elements in clutching engagement for effecting different functions, an overrunning friction clutch operatively disposed between said other two of said elements, and another shaft aligned with said driven shaft and operatively connected to said other two of said elements.

27. In the drive system of a motor vehicle, a drive member provided with positive clutch teeth, an overrunning friction clutch carried by said drive member, a splined driven shaft aligned with said drive member, a clutch member having clutch teeth mateable with said positive clutch teeth and slidably splined on said shaft, said member being slidable to first bring said overrunning friction clutch into operation and further slidable in the same direction to couple said clutch teeth for providing a two-way drive between said drive member and said driven shaft.

28. In the drive system of a motor vehicle, a drive member provided with positive clutch teeth and forming one element of an overrunning friction clutch, an outer member carried by and movable relative to said drive member and forming a cooperating element of an overrunning friction clutch, a splined driven shaft aligned with said drive member, a clutch member having clutch teeth mateable with said positive clutch teeth and slidably splined on said shaft, said member being slidable to first bring said overrunning friction clutch into operation and further slidable in the same direction to couple said clutch teeth for providing a two-way drive between said drive member and said driven shaft.

29. In the drive system of a motor vehicle, a drive member provided with internal clutch teeth and forming one part of an overrunning friction clutch, the other part of said overrunning friction clutch being disposed outwardly of said member, a splined driven shaft aligned with said drive member, a clutch member slidably splined on said driven shaft and having external clutch teeth engageable with said internal clutch teeth, said members being slidable to first bring said overrunning friction clutch into operation and further slidable in the same direction to couple said internal and external clutch teeth for providing a two-way drive between said drive member and said driven shaft.

30. In the drive system of a motor vehicle, driving and driven shafts, a clutch member fixed for rotation with said driving shaft, an axially shiftable clutch member slidably splined to said driven shaft, a second clutch member carried by said first mentioned clutch member, an annular clutch member disposed outwardly of said first mentioned clutch member, an overrunning friction clutch operatively disposed between said last two mentioned clutch members, means for axially shifting said shiftable clutch member for engaging the same with one of said other clutch members to render said overrunning friction clutch operative for providing an overrunning friction drive between said shafts, the grip of said overrunning friction clutch being increased due to the torque resistance of one of said shafts to rotation by the other of said shafts, said means being further shiftable in the same direction for engaging said shiftable clutch member with the other of said other clutch members for providing a positive two-way drive between said shafts.

31. In the drive system of a motor vehicle, the combination of driving and driven shafts, a member of an overrunning friction clutch fixed against axial movement relative to one of said shafts, a clutch member carried by said fixed clutch member and movable relative thereto, and means including a shiftable clutch element slidably splined to the other of said shafts and cooperable with said clutch members for progressively establishing a driving connection between each of said clutch members respectively and said other shaft, whereby first an overrunning friction drive and then a two-way drive is established between said shafts, the grip of said overrunning friction clutch being increased due to the torque resistance of one of said shafts to rotation by the other of said shafts.

32. In the drive system of a motor vehicle, driving and driven shafts, a clutch member fixed for rotation with said driving shaft and being provided with internal radially extending projections, an axially shiftable clutch member slidably splined to said driven shaft and being provided with external radially extending projections, an annular clutch member disposed outwardly of said first mentioned clutch member and capable of a limited movement relative thereto, an overrunning friction clutch operatively disposed between said two last mentioned clutch members, said overrunning friction clutch being engaged by axial movement of said shiftable clutch member, and the grip of said overrunning friction clutch being increased by the tendency of one of the members thereof to drive the other of the members thereof, said shiftable member being further shiftable axially in the same direction for engaging the teeth thereof with the teeth of said first mentioned clutch member for providing a positive two-way drive between said shafts.

33. In the drive system of a motor vehicle, a drive member provided with positive clutch teeth, said member having formed thereon one element of an overrunning friction clutch, an outer member carried by and movable relative to said drive member and forming a cooperating element of an overrunning friction clutch, means for securing said members in cooperating relation, a splined driven shaft aligned with said drive member, a clutch member having clutch teeth mateable with said positive clutch teeth and slidably splined on said shaft, said member being slidable to first bring said overrunning friction clutch into operation and further slidable in the same direction to couple said clutch teeth for providing a positive drive between said drive member and said driven shaft.

34. In the drive system of a motor vehicle, a drive member having internal radially extending projections and forming one part of an overrunning friction clutch, a driven member having external radially extending projections, a shaft upon which said driven member is slidably splined, the other part of said clutch having internal radially extending projections and being movable relative to said first part of said clutch, means for securing said parts of said overrunning friction clutch in cooperating relationship, and means for causing the external radially extending projections of said driven member to engage first with the internal radially extending projections of said other part of said clutch to provide an overrunning friction drive between said drive member and said shaft, and then with the internal radially extending projections of said drive member to set up a positive drive between said drive member and said driven shaft, the grip of said overrunning friction clutch being increased due to the tendency of one of the members thereof to drive the other of the members thereof.

35. In the drive system of a motor vehicle, a drive member provided with positive clutch teeth, an overrunning friction clutch carried by said drive member, the diameter of the friction surfaces of said clutch being greater than the pitch diameter of said clutch teeth, a splined driven shaft aligned with said drive member, a clutch member having clutch teeth mateable with said positive clutch teeth and slidably splined on said shaft, said member being slidable to first bring said overrunning friction clutch into operation and further slidable in the same direction to couple said clutch teeth for providing a two-way drive between said drive member and said driven shaft.

36. In the drive system of a motor vehicle, a drive member provided with clutch teeth and forming one part of an overrunning friction clutch, the other part of said overrunning friction clutch being disposed outwardly of said member, the diameter of the friction surfaces of said overrunning friction clutch parts being greater than the pitch diameter of said clutch teeth, a splined driven shaft aligned with said drive member, a clutch member slidably splined on said driven shaft and having clutch teeth engageable with said clutch teeth of said drive member, said clutch member being slidable to first bring said overrunning friction clutch into operation and further slidable in the same direction to couple said clutch teeth for providing a positive two-way drive between said drive member and said driven shaft.

37. In the drive system of a motor vehicle, a drive member provided with positive clutch teeth and forming one element of an overrunning friction clutch, an outer member disposed outwardly of said drive member and movable relative thereto, said outer member forming a cooperating element of said overrunning friction clutch, the diameter of the friction surfaces of said overrunning friction clutch being greater than the pitch diameter of said clutch teeth, a splined driven shaft aligned with said drive member, a clutch member having clutch teeth mateable with said positive clutch teeth and slidably splined on said shaft, said member being slidable to first bring said overrunning friction clutch into operation and further slidable in the same direction to couple said clutch teeth for providing a positive drive between said drive member and said driven shaft.

CARL F. RAUEN.